Aug. 28, 1923.
J. E. SERSTE
VEHICLE BODY
Filed March 21, 1922
1,466,345
3 Sheets-Sheet 1
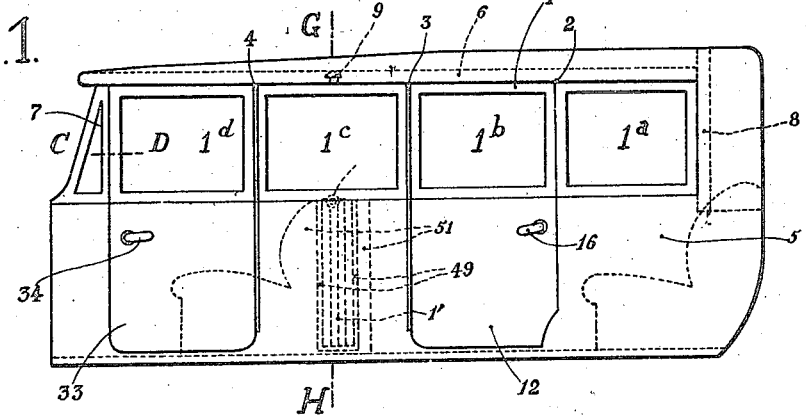
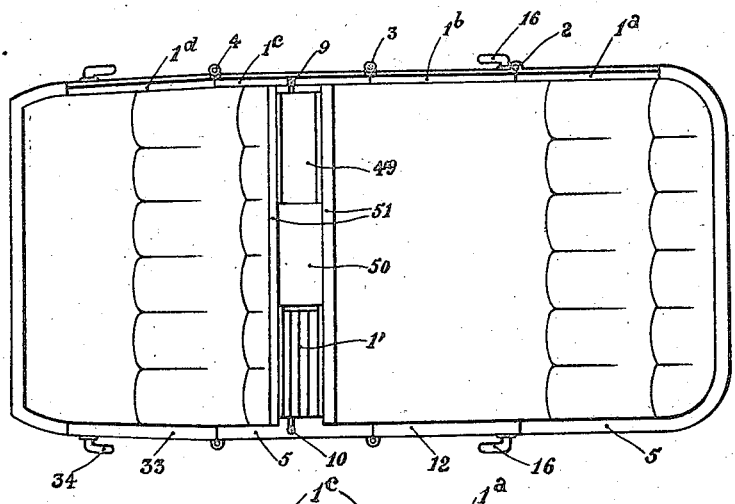
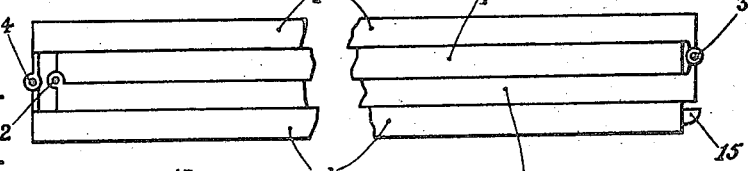
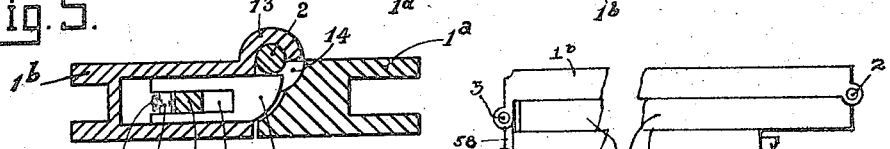
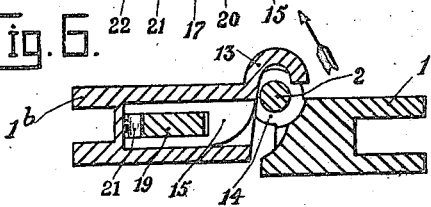
Inventor
Jacques Egide Serste,
per Hasseltine Lake
Attorneys.

Aug. 28, 1923.                    J. E. SERSTE                    1,466,345
                                  VEHICLE BODY
                            Filed March 21, 1922        3 Sheets-Sheet 2
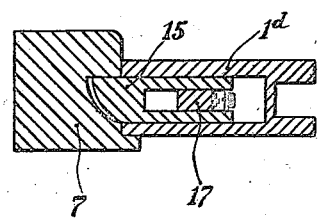
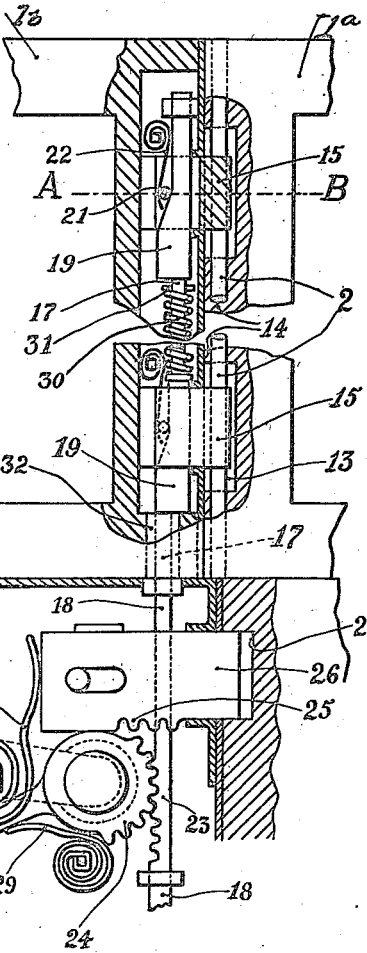
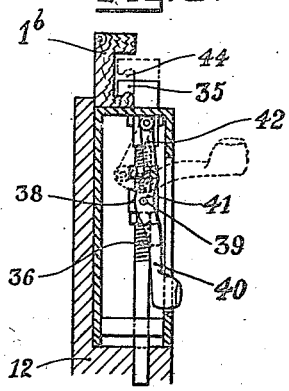
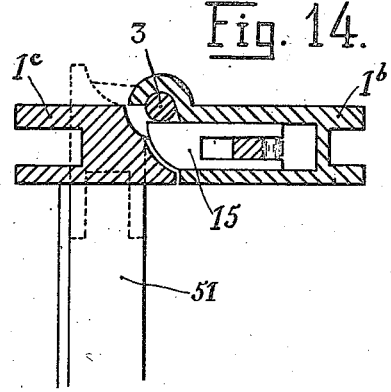
Inventor
Jacques Egide Sersté
per Haseltine Lake
                Attorneys Aug. 28, 1923.
J. E. SERSTÉ
VEHICLE BODY
Filed March 21, 1922
1,466,345
5 Sheets-Sheet 3
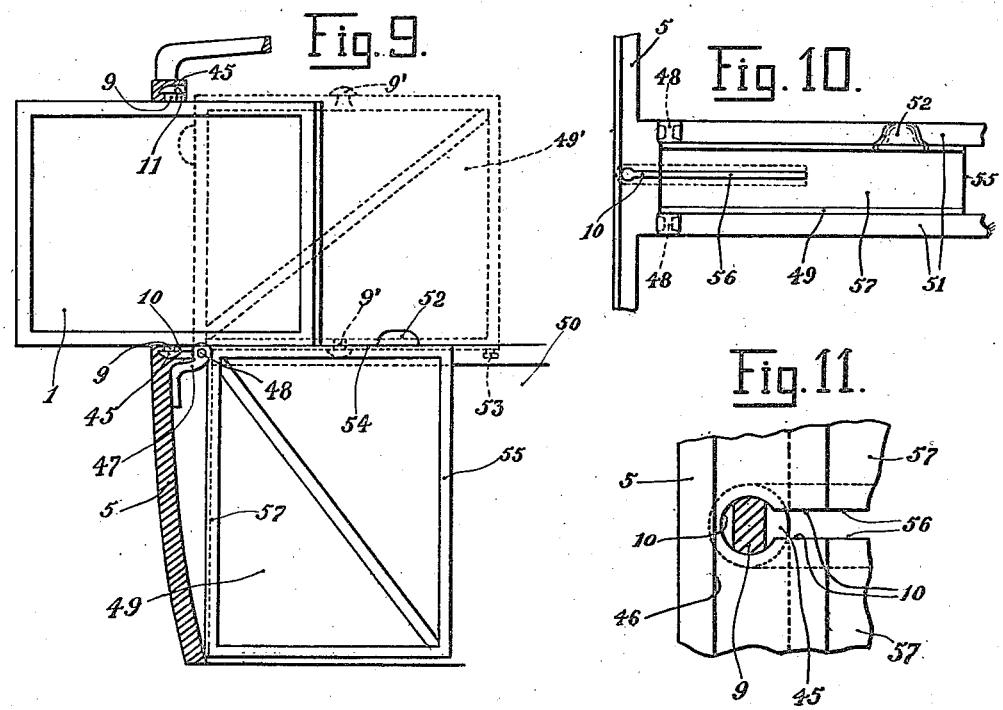
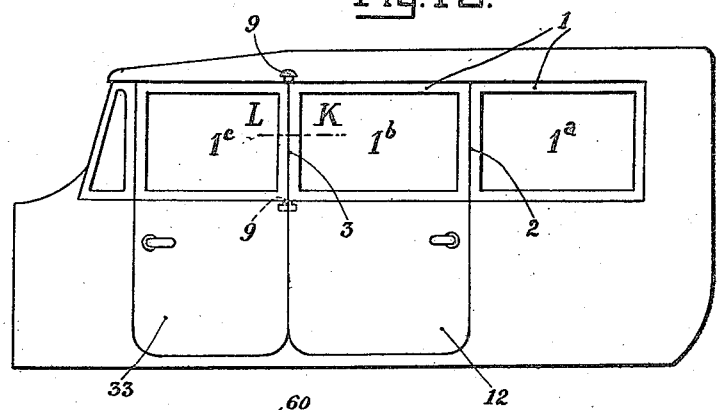
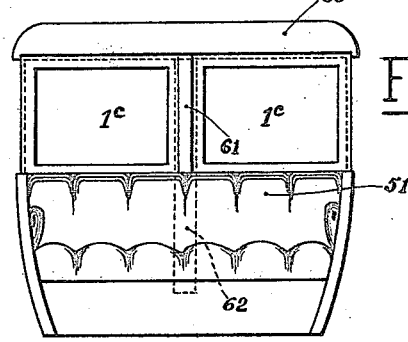
Inventor
Jacques Egide Sersté,
per
Attorneys.

Patented Aug. 28, 1923.

1,466,345

UNITED STATES PATENT OFFICE.

JACQUES EGIDE SERSTÉ, OF BRUSSELS, BELGIUM.

VEHICLE BODY.

Application filed March 21, 1922. Serial No. 545,554.

*To all whom it may concern:*

Be it known that I, JACQUES EGIDE SERSTÉ, a subject of the King of the Belgians, residing at Brussels, Belgium, have invented certain new and useful Improvements in Vehicle Bodies, of which the following is a specification.

The present invention relates to improvements in bodies of automobiles and other vehicles, of the type known as transformable bodies, the upper part of which, comprising the jointed frames of the windows and the canopy, can be closed up or opened out at pleasure so as to permit of the transformation of a closed vehicle into an open vehicle and vice versa.

The principal object of the invention is to do away with certain disadvantages which have hitherto appeared inherent in this kind of body. Thus, in view of the necessity of preserving the liberty of movement of the rear doors, it has been impossible to prolong the glazed frames towards the rear of the vehicle beyond these doors. On the other hand the fixing of the opened out frames in the jamb of the doorway necessitated the use of devices the manipulation of which complicated the operations of setting and removing the frames. Furthermore, difficulties resulted from the fact that the method of supporting the frames has to be such that such frames when closed up may be easily accommodated within the body while yet being efficiently protected against damage. If the frame be lowered in grooves formed in the side walls of the body, it is necessary to give to these walls an exaggerated thickness and it is also impossible to make the spindles of the hinges of the glazed frames coincide with those of the hinges of the doors, while if the closed up frames be carried below the front seat of the vehicle it is difficult to protect them efficiently without complicating the construction and the operations of transforming the body.

In the body according to the present invention the glazed frames possess, at suitable points, hinges provided with movable members which permit of making or breaking at will the connection between the spindle of the hinge and one of the adjacent panels of the frame. By placing one of these hinges above the free edge of the rear door the glazed frame can be prolonged beyond this latter which allows the rear of the vehicle to have movable glazed panels.

The movable member or members of the detachable hinges may advantageously be controlled or operated by a mechanism worked by the handle of the door, so that when the door is opened, the glazed frame divides into two parts without obstructing the movement of the door, whilst when the door is closed again the connection between the two parts of the frame is reestablished automatically.

The mechanism which operates the movable members of the hinge is preferably composed of a rod divided at the level of the upper edge of the body of the vehicle and the lower part of which, operated by the door handle, is carried by the door, while its upper part, which operates the connecting members of the hinge, is carried by the glazed frame. The operation of the handle disengages both the bolt of the lock and the connecting members of the hinge to which the mechanism preferably gives an advance movement so that these parts shall not obstruct the opening of the door.

A similar mechanism may be adapted for example to the front door so as to operate members such as bolts which engage in the frame into which the glazed frame fits and which is formed, on either side of the body, by the lateral edges of the body and the canopy previously extended. Without complicating the necessary manipulations means are thus provided which contribute efficiently to the prevention of any vibration of the glazed frame in its frame.

The use of detachable hinges permits, on the other hand, of moving the front panels of the glazed frames so as to transform a body of the "sedan" type into a body of the "limousine" or "coupe" type.

For the purpose of facilitating the accommodation of the closed up frames into interior of the body, these frames are each mounted on a horizontal spindle running parallel with the lateral edge of the body, so that after having been closed up, each frame can be lowered into a space provided in the thickness of the back of the front seat of the body.

Two forms of transformable body constructed according to the present invention are represented by way of examples in the accompanying drawings:

Figure 1 is a side view and
Figure 2 a plan view (without the canopy) of a body with frames having four panels.

Figure 3 is a plan (on a larger scale) of the frame closed up.

Figure 4 is an elevation (partially in section) showing the detachable hinge.

Figures 5 and 6 are cross-sections along the line A—B of Figure 4 showing respectively the hinge when closed and when opened.

Figure 7 likewise is a cross-section, taken along the line C—D of Figure 1.

Figure 8 is a section on the line E—F of Figure 4.

Figure 9 is a partial section along the line G—H of Figure 1.

Figure 10 is a plan of the space for receiving the closed up frame and

Figure 11 represents a detail on an enlarged scale.

Figure 12 is a side view of a body with frames having three panels.

Figure 13 is a front view of this body transformed into a limousine.

Figure 14 is a section along the line I—K of Figure 12.

Figure 15 is a plan view of a closed up frame.

In the body shown in Figure 1 the frames 1 of the windows are each composed of four panels $1^a$, $1^b$, $1^c$ and $1^d$ connected to each other at 2, 3 and 4 respectively by hinges (see Figures 1 and 3). In its extended position each frame fits between the side walls 5 of the body, the corresponding longitudinal member 6 of the canopy, the upright 7 of the wind screen and the main hoop 8 of the canopy. One of the panels, $1^c$, carries at its centre for example a pivot in two parts 9, 9 which engage in recesses 10 and 11 formed respectively in the wall 5 and the longitudinal member 6 (see Figure 9).

The panel $1^a$ is situated behind the rear door 12. To allow this latter to be opened, one, 13, of the parts 13, 14 forming the hinge situated above the free edge of the door, only partially surrounds the spindle 2 of this hinge (Figures 4, 5 and 6). The sleeve formed by this half of the hinge is completed by one or more movable members 15 in the form of bolts mounted to slide in the panel $1^b$. In the closed position (Figure 5) the bolts 15 assure the connection of the panel $1^b$ to the spindle 2, while in the open position (Figure 6) the bolts 15 are moved so as to permit movement of the door in the direction of the arrow, the glazed frame then dividing itself into two parts at the point of the hinge 2.

The bolts 15 are operated by the handle 16 of the door 12 by means of a rod divided, at the level of the upper edge of the body 5 into two parts, one of which, 17 is mounted in the panel $1^b$ and the other 18 in the door 12. The rod 17 carries opposite each bolt 15 a projection 19 which extends through a recess 20 in the bolt 15 and has an inclined face against which a pin or a roller 21 integral with the bolt 15, is pressed by a spring 22. The rod 18 is provided with a series of teeth 23 engaging with a truncated gear wheel 24 keyed on the spindle of the handle 16.

As shown in Figure 4 when the handle 16 is operated the gear wheel 24 first lifts the rod 18 with the rod 17, the projections 19 on which cause the bolts 15 to slide towards the panel $1^b$, then the gear wheel 24 engages in a series of teeth 25 on the bolt 26 of the door lock and withdraws it from the hole 27. By means of the advance given by the truncated gear 24 to the movement of the bolts 15 relatively to that of the bolt 26 the bolts 15 are prevented from obstructing the opening of the door 12 when the handle 16 is abruptly operated.

When the handle 16 is released the springs 28 and 29 bring back on the one hand the bolt 26 and on the other hand the gear wheel 24 and the rod 18 into their normal positions, while the springs 22 act in like manner on the bolts 15 and a spring 30 bearing on an eye 31 integral with the panel $1^b$ thrusts the rod 17 downwards until the lower projection 19 rests on a socket 32 integral with the panel. Like the bolt 26 the small bolts 15 are bevelled so that they act automatically when the door of the vehicle is slammed.

In order to secure the opened out frame in its frame a similar mechanism to that described above may be adapted to the front door 33, the bolts 15 operated by the handle 34 of this door ensuring in this case the connection between the panel $1^d$ and the upright 7 of the wind screen (see Figure 7). In both cases it is obvious that the rod 17 might be caused to act, through the medium of suitable mechanism, on bolts mounted in the upper part of the panels so as to ensure the connection thereof to the longitudinal members of the canopy.

The frame may be fixed to the doors very simply by the aid of clamps (see Figures 4 and 8) comprising hooks 35 mounted each on a screw threaded rod 36 adapted to slide vertically in the door. On the rod 36 is mounted between two nuts 37 a sleeve 38 provided with lateral trunnions 39 which act as pivots for a handle 40 integral with a lever 41 which forms a knuckle joint with two small connecting rods 42 pivoted to lugs 43 fixed to the door. The frame 1 is provided with notches 44 the lower edges of which fits the form of the hooks and can be liberated thereby when the handle 40 is raised to bring the mechanism into the position shown by dotted lines in Figure 8.

To transform the body described into an open body this frame 1 is closed up in the manner indicated in Figure 3 it is then caused to turn on its pivots 9 so as to place it at right angles to the wall 5 of the body as shown in Figure 9. The pivots 9 are provided with an enlarged head 45 and they are of elongated section as indicated by Figure 11 which is a top plan of the wall 5 showing the seat 10 of the lower pivot 9 and the ledge 46 against which the opened out frame fits. The two seats 10 and 11 are each prolonged on the inside of the vehicle by a groove just large enough to allow of the passage of the narrow side of the pivots 9 which is situated opposite the groove when the frame is placed in the position of Figure 9.

In a bracket 47 fixed to the wall 5 are mounted two trunnions 48 integral with a box 49 which in the position indicated in full lines in Figure 9 is seated in a space 50 formed in the thickness of the wall 51 forming the back of the front seat of the vehicle. This box is provided with a handle 52 or with a lever which permits of its being caused to swing about the spindle 48 so as to bring it into the position 49' represented in dotted lines in Figure 9 in which it is retained by a small spring stop 53. The sides 54 and 55 of the box 49 are open so that in this position the box embraces a portion of the frame 1, while a groove 56 made in the bottom 57 of the box 49 is in alignment with the entrance to the seat 10 (see Figures 10 and 11).

The frame 1 can then be slid towards the interior of the vehicle until it passes entirely into the box 49, the pivots 9, 9 then moving to 9', 9' (see Figure 9) then after having withdrawn the stop 53 the box 49 is let down with its contents into the seating or recess 50. The frame 1 then occupies the position 1' indicated in Figures 1 and 2 and may be covered in with a cover fitted to the recess 50. This method of construction facilitates the lowering of the glazed frames and ensures an efficient protection thereto without interfering with the fixing of folding seats to the wall 51 or with the ornamentation thereof.

The system of lowering above described may also be applied to glazed frames with three panels such as those of the body represented in Figure 12, the sole difference being that in this case the pivots 9, 9 coincide with the spindle 3 of the hinge connecting the panels 1ᵇ and 1ᶜ. This body has also the advantage of permitting of the transformation with ease of a "sedan" body into a "limousine" or a "coupe" by the lowering of the panels 1ᶜ above the back 51 as shown in Figure 13. To this end the hinge 3 may be provided with movable members 15 for making it detachable like the hinge 2. In order to effect the desired transformation, it then suffices to operate the members 15 to liberate the panel 1ᶜ, to remove this panel, to turn it over and replace it on the back 51. This constructional form is shown in cross section in Figure 14 in which the panel 1ᶜ is drawn in full lines in the position which it occupies normally on the door 33 and in dotted lines in the reversed position which it can occupy on the back 51. The same result might also be obtained in another way for example by doubling the hinge connecting the panels 1ᵇ and 1ᶜ, the panel 1ᶜ being connected to the spindle 3 by the plate 58 and the spindle 59 (see Figure 15) around which the panel 1ᶜ can turn in the reverse direction to the movement which it can make around the spindle 3.

When the panels 1ᶜ are turned back or reversed on to the back 51 (see Figure 13) they fit between said back, the hoop 60 of the canopy and an upright 61 which, when the upper part of the body is taken down, can be lowered into a recess 62 formed in the thickness of the seat back 51. For the rest the movement and lowing of the glazed frames in Figure 12 is carried out in the manner described with reference to Figure 9.

I claim:

1. In a transformable vehicle body, the combination of a side wall, a door in said side wall, a window frame comprising panels hinged to one another and adapted to rest on said side wall and door, a handle for said door and means operatable by said door handle for dividing said frame at the junction of two adjacent panels.

2. In a transformable vehicle body, the combination of a side wall, a door in said side wall, a window frame having two panels hinged to one another and resting respectively on said door and on said side wall beyond the free edge of said door, and means for disconnecting said panels at the point of the free edge of the door said means being operative to restore the connection between said panels when the door is closed.

3. In a transformable vehicle body, the combination of a side wall, a door in said side wall, a window frame having two panels hinged to one another and resting on said side wall and door respectively, a handle for said door, and means operated by said handle for disconnecting said panels from one another said means being operative to restore the connection between said panels when the door is closed.

4. In a transformable vehicle body, the combination of a side wall, a door in said side wall, a window frame having two panels hinged to one another and resting on said side wall and door respectively, a handle for said door, a rod in said door operatively connected to said handle, a rod in the panel resting on said door, the latter rod resting on the former rod, and means operated by the latter rod for disconnecting said panels.

5. In a transformable vehicle body, the combination of a side wall, an upright rigid with said side wall, a door in said side wall adjacent said upright, a handle for said door, a window frame comprising panels hinged to one another, a clamp for rigidly securing one of said panels on said door, a clamp for rigidly securing another of said panels on said side wall, bolts slidable laterally from the first mentioned panel and adapted to engage said upright, said bolts being actuated by a vertically slidable member and means controlled by said handle for operating said member.

6. In a transformable vehicle body, the combination of a side wall, an upright rigid with said side wall, a door in said side wall adjacent said upright, a handle for said door, a window frame comprising panels hinged to one another, a clamp for rigidly securing one of said panels on said door, a clamp for rigidly securing another of said panels on said side wall, a bolt for locking said door to said side wall, a bolt for locking the first mentioned panel to said upright said bolts being slidable laterally, and means controlled by said handle for operating the last mentioned bolt in advance of the door bolt.

7. In a transformable vehicle body, the combination of a side wall, a door in said side wall, a handle for said door, a window frame having two panels resting on said side wall and door respectively, a hinge having a spindle engaging both said panels, and means operated by said handle for disengaging one of said panels from said spindle.

8. In a transformable vehicle body, the combination of a side wall, a door in said side wall, a window frame having a panel resting on said side wall and a panel resting on said door, a hinge connecting said panels with each other and comprising a spindle, a sleeve surrounding said spindle and secured to the first mentioned panel and a sleeve partially surrounding said spindle and secured to the second mentioned panel, a movable member in said panel co-operating with said second mentioned sleeve in surrounding said spindle, and means controlled by the door handle for moving said member clear of said spindle.

9. In a transformable vehicle body, the combination of a side wall, a door in said side wall, a window frame having a panel resting on said door and a panel adjacent the first mentioned panel, a hinge connection between said panels comprising a spindle, a sleeve secured to the last mentioned panel and surrounding said spindle and a spring bolt mounted on the first panel and engaging said spindle, and means controlled by the door handle for moving said bolt clear of said spindle.

10. In a transformable vehicle body, the combination of a side wall, a door in said side wall, a window frame having a panel resting on said door and a panel resting on said side wall beyond the free edge of said door, a hinge connection between said panels having a spindle in permanent engagement with the last mentioned panel, a member on the first mentioned panel engaging said spindle, means for moving said member out of engagement with said spindle, and means for restoring the engagement of said member with said spindle when said door is slammed.

11. As a novel article of manufacture, a window frame for automobile bodies and the like, comprising two panels arranged side by side, a hinge spindle between said panels, connections between both said panels and said spindle, and movable means on one of said panels operated by the door handle for releasing and restoring the connection between said panel and said spindle.

In testimony, that I claim the foregoing as my invention, I have signed my name in presence of two subscribing witnesses.

JACQUES EGIDE SERSTÉ.

Witnesses:
CHARLES PLUCKER,
HENRY W. PLUCKER.